(12) United States Patent
Chong et al.

(10) Patent No.: US 11,401,706 B2
(45) Date of Patent: Aug. 2, 2022

(54) STEPPED BASIN SINK

(71) Applicant: Elkay Manufacturing Company, Oak Brook, IL (US)

(72) Inventors: Jonathan Chong, Chicago, IL (US); Daniel Worst, Mount Prospect, IL (US)

(73) Assignee: Elkay Manufacturing Company, Oak Brook, IL (US)

( * ) Notice: Subject to any disclaimer, the term of this patent is extended or adjusted under 35 U.S.C. 154(b) by 82 days.

(21) Appl. No.: 16/805,391

(22) Filed: Feb. 28, 2020

(65) Prior Publication Data

US 2020/0277769 A1 Sep. 3, 2020

Related U.S. Application Data

(63) Continuation of application No. 16/746,086, filed on Jan. 17, 2020.

(60) Provisional application No. 62/811,799, filed on Feb. 28, 2019.

(51) Int. Cl.
| | | |
|---|---|---|
| *E03C 1/326* | (2006.01) | |
| *E03C 1/182* | (2006.01) | |
| *C02F 1/00* | (2006.01) | |

(52) U.S. Cl.
CPC .............. *E03C 1/326* (2013.01); *C02F 1/003* (2013.01); *E03C 1/182* (2013.01); *C02F 2209/445* (2013.01)

(58) Field of Classification Search
CPC . E03C 1/326; E03C 1/182; E03C 1/18; E03C 1/186; E03C 1/00; E03C 1/16; E03C 1/322; E03C 1/328; C02F 1/003; C02F 2209/445; D06F 1/04

USPC ..................... 4/619, 632, 637, 656
See application file for complete search history.

(56) References Cited

U.S. PATENT DOCUMENTS

| | | | | |
|---|---|---|---|---|
| 94,501 A | * | 9/1869 | Morahan ................... | D06F 1/04 |
| | | | | 68/233 |
| 139,684 A | * | 6/1873 | Morahan ................... | D06F 1/04 |
| | | | | 68/233 |
| 275,755 A | * | 4/1883 | Elliott ....................... | E03C 1/18 |
| | | | | 4/286 |

(Continued)

FOREIGN PATENT DOCUMENTS

| | | |
|---|---|---|
| DE | 10058051 C1 | 7/2002 |
| JP | 3212793 U | 10/2017 |

OTHER PUBLICATIONS

International Search Report and Written Opinion dated May 7, 2020, for International Patent Application No. PCT/US2020/020484, 15 pages.

*Primary Examiner* — Benjamin R Shaw
(74) *Attorney, Agent, or Firm* — Neal, Gerber & Eisenberg LLP

(57) ABSTRACT

An example sink having a stepped sink basin is provided. The sink includes a front wall, a rear wall, a first side wall and a second side wall. The sink also includes a stepped sink basin that includes a raised portion and a lower basin portion. The raised portion of the basin provides a front ledge extending from the front wall toward the rear wall, and extending between the first and second side walls below a top plane of the sink. The lower portion of the basin extends from a bottom of the rear wall toward the front wall, the lower basin defining a drain. The sink still further includes a surface connecting the front ledge to the lower basin.

16 Claims, 13 Drawing Sheets

(56) References Cited

U.S. PATENT DOCUMENTS

| | | | | |
|---|---|---|---|---|
| 1,522,045 A | * | 1/1925 | Burton | E03C 1/182 |
| | | | | 134/115 R |
| 1,728,502 A | * | 9/1929 | McGregor | A47L 19/02 |
| | | | | 99/425 |
| 1,797,629 A | * | 3/1931 | Wittmayer | D06F 1/04 |
| | | | | 68/233 |
| 1,814,698 A | * | 7/1931 | Huber | D06F 1/04 |
| | | | | 68/233 |
| 1,936,310 A | * | 11/1933 | Rodota | D06F 1/04 |
| | | | | 68/233 |
| 2,027,707 A | * | 1/1936 | Schmiedeknecht | E03C 1/18 |
| | | | | D23/287 |
| 2,028,802 A | * | 1/1936 | Ottke | E03C 1/18 |
| | | | | D23/290 |
| 2,035,000 A | * | 3/1936 | Swain | E03C 1/182 |
| | | | | 4/642 |
| 2,157,786 A | * | 5/1939 | Coordes | E03C 1/33 |
| | | | | 4/631 |
| 2,282,571 A | * | 5/1942 | Graf | B21D 22/26 |
| | | | | 4/619 |
| D142,688 S | | 10/1945 | Beebe | |
| 2,658,205 A | | 11/1953 | Bowden | |
| 2,669,240 A | | 2/1954 | Thorson | |
| 2,847,681 A | * | 8/1958 | Jacobs | E03C 1/33 |
| | | | | 137/636.2 |
| 3,487,478 A | * | 1/1970 | Ulysses | A47K 1/08 |
| | | | | 4/619 |
| 4,462,126 A | * | 7/1984 | Cleaveland | E03C 1/18 |
| | | | | 4/619 |
| 4,862,528 A | * | 9/1989 | Clarke | E03C 1/12 |
| | | | | 4/654 |
| 5,105,485 A | * | 4/1992 | Sciabarassi | A47J 47/20 |
| | | | | 4/656 |
| 5,412,818 A | * | 5/1995 | Chen | E03C 1/14 |
| | | | | 4/642 |
| 5,715,547 A | * | 2/1998 | Becker | D06F 1/02 |
| | | | | 4/619 |
| 6,502,254 B1 | * | 1/2003 | De Menna | A47B 77/022 |
| | | | | 4/631 |
| D499,801 S | | 12/2004 | Soulier | |
| D520,611 S | | 5/2006 | Wozniczka et al. | |
| D551,742 S | * | 9/2007 | Plikuhn | D23/284 |
| D575,379 S | | 8/2008 | Ziemann et al. | |
| D624,634 S | | 9/2010 | Thomas | |
| 7,854,030 B2 | * | 12/2010 | Lee | A47K 1/00 |
| | | | | 211/41.9 |
| D631,143 S | | 1/2011 | Thomas | |
| D670,367 S | | 11/2012 | Miller et al. | |
| D694,377 S | | 11/2013 | Mustee et al. | |
| D799,648 S | | 10/2017 | Chong | |
| D799,649 S | | 10/2017 | Chong | |
| D849,893 S | | 5/2019 | Chen et al. | |
| D849,894 S | | 5/2019 | Chen et al. | |
| 2008/0148475 A1 | * | 6/2008 | Lin | A47L 17/02 |
| | | | | 4/639 |
| 2013/0061389 A1 | * | 3/2013 | Huber | E03C 1/18 |
| | | | | 4/619 |
| 2013/0283521 A1 | * | 10/2013 | Jain | E03C 1/186 |
| | | | | 4/654 |
| 2017/0172379 A1 | * | 6/2017 | Keller | A47L 19/02 |
| 2018/0044901 A1 | | 2/2018 | Lloyd | |
| 2018/0187402 A1 | | 7/2018 | Chong et al. | |
| 2018/0187403 A1 | | 7/2018 | Chong et al. | |
| 2018/0259202 A1 | | 9/2018 | Kim et al. | |
| 2020/0102726 A1 | * | 4/2020 | Miller | E03C 1/33 |

* cited by examiner

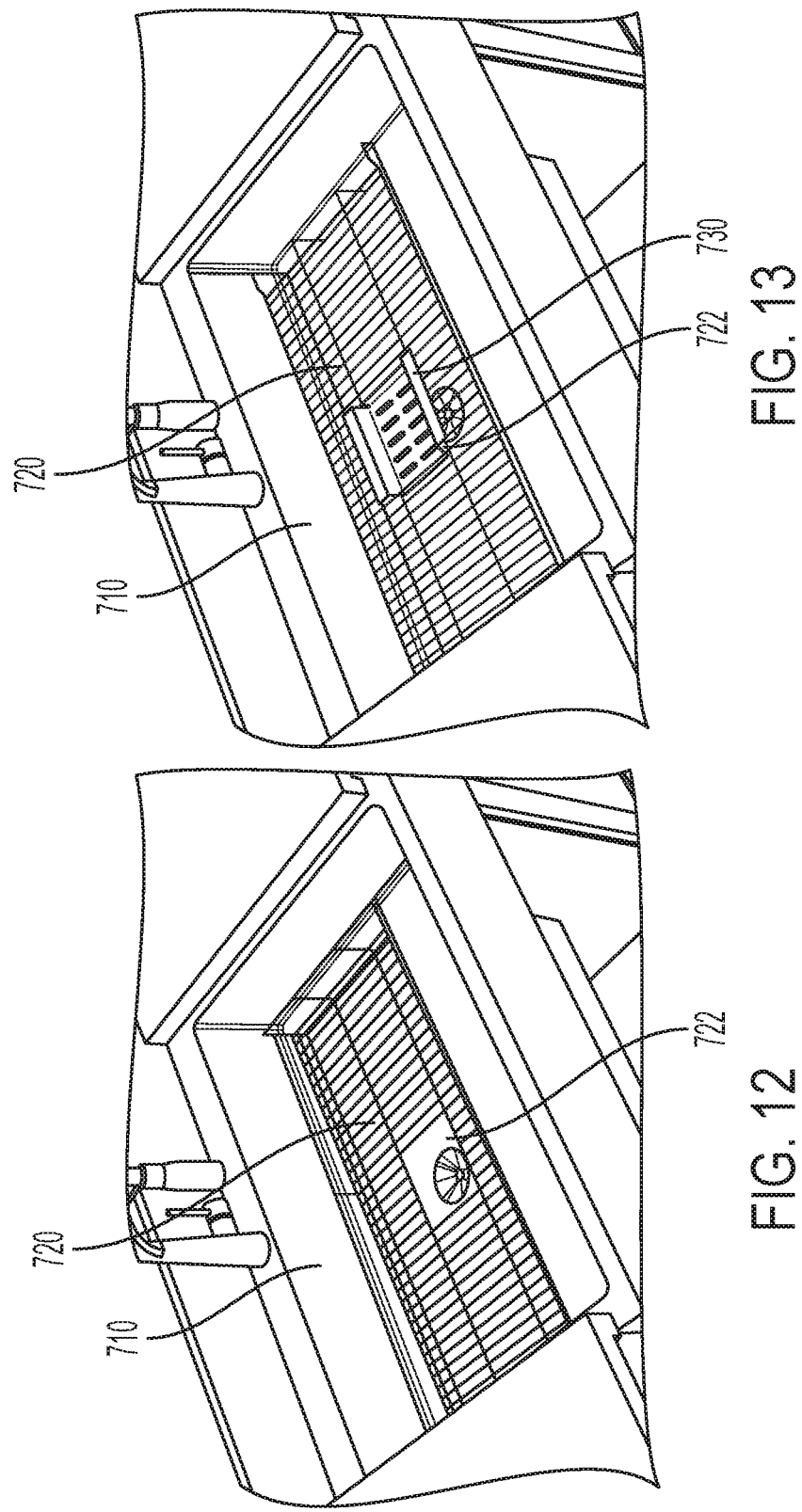

STEPPED BASIN SINK

CROSS REFERENCE TO RELATED APPLICATION

This application claims the benefit of and priority to U.S. Provisional Patent Application No. 62/811,799, filed Feb. 28, 2019, and U.S. Non-Provisional patent application Ser. No. 16/746,086, filed Jan. 17, 2020, both of which are incorporated herein by reference in their entirety.

TECHNICAL FIELD

The present disclosure relates generally to sinks and sink basins, and more particularly to a dual-depth sink that includes a raised ledge and a lower basin which can be installed according to ADA standards.

BACKGROUND

Sinks having traditional designs typically include one or two sink basins surrounded by walls. Traditional sink designs do not lend themselves to compliance with Americans with Disabilities Act (ADA) accessibility standards. Traditional sink basins include a flat bottom portion forming a drain opening, and are typically surrounded by a flange used to mount the sink within a cabinet. Additionally, due to their design, traditional sinks include no internal structures or features that lend themselves well to storage of household items typically used in or around the sink, such as sponges, soap bottles, dish rags, cleaning brushes and the like. In the past, various solutions have been proposed for facilitating storage of items in or around the sink, including saddles having pockets that are supported onto a sink divider, magnetically or suction-cup supported hooks or other accessories that attach onto or are otherwise associated with a sidewall of the sink, and others.

SUMMARY

The present disclosure summarizes aspects of some contemplated embodiments, and should not be used to limit the scope of the claims. Other implementations are contemplated in accordance with the techniques described herein, as will be apparent to one having ordinary skill in the art upon examination of the following drawings and detailed description, and these implementations are intended to be within the scope of this application.

The present disclosure is related to sink having a stepped basin design. In one embodiment of the present disclosure, an example sink includes a front wall, a rear wall, a first side wall and a second side wall. The sink also includes a raised portion extending from the front wall toward the rear wall, and extending between the first and second side walls below a top plane of the sink. The sink further includes a lower basin extending from a bottom of the rear wall toward the front wall, the lower basin defining a drain. The sink yet further includes a connecting surface connecting the raised portion to the lower basin.

In one embodiment, the raised portion is oriented at an angle with respect to the top plane of the sink, such that a front edge of the raised portion is higher than a rear edge of the raised portion.

In one embodiment, the raised portion includes a plurality of raised portion surface features. The plurality of raised portion surface features may be oriented parallel to the front wall, may be oriented transverse to the front wall, or may be oriented in some other direction.

In one embodiment, the connecting surface connecting the raised portion to the lower basin is oriented parallel to the front wall (e.g., vertical). In other embodiments, the connecting surface connecting the raised portion to the lower basin is oriented at an angle with respect to the front wall. (e.g., such that the top edge of the connecting surface is closer to the front wall than the bottom edge of the surface).

In one embodiment, the connecting surface connecting the raised portion to the lower basin includes a plurality of connecting surface features. The plurality of connecting surface features may be oriented parallel to the front wall (e.g., extending in the direction from the first side wall to the second side wall), or may be oriented transverse to the front wall (e.g., extending in the direction from the front wall to the rear wall).

In some embodiments, the lower basin comprises a first bowl and a second bowl separated from the first bowl. The sink may also include a divider extending from the rear wall to the connecting surface, separating the first bowl and the second bowl. In some examples, the first bowl is a different shape than the second bowl, and/or the first bowl has a different depth than the second bowl.

In certain embodiments, the sink further includes a wire grid positionable within the lower basin. The wire grid may be positionable in a first position to create a top surface even with a rear edge of the raised portion.

In certain embodiments, the connections between the front wall and the first and second side walls, and between the rear wall and the first and second side walls produce low-radiused corners.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 12 and 13 illustrate an example sink including a wire grid in two positions, according to embodiments of the present disclosure.

DETAILED DESCRIPTION OF EXAMPLE EMBODIMENTS

Figure 1:
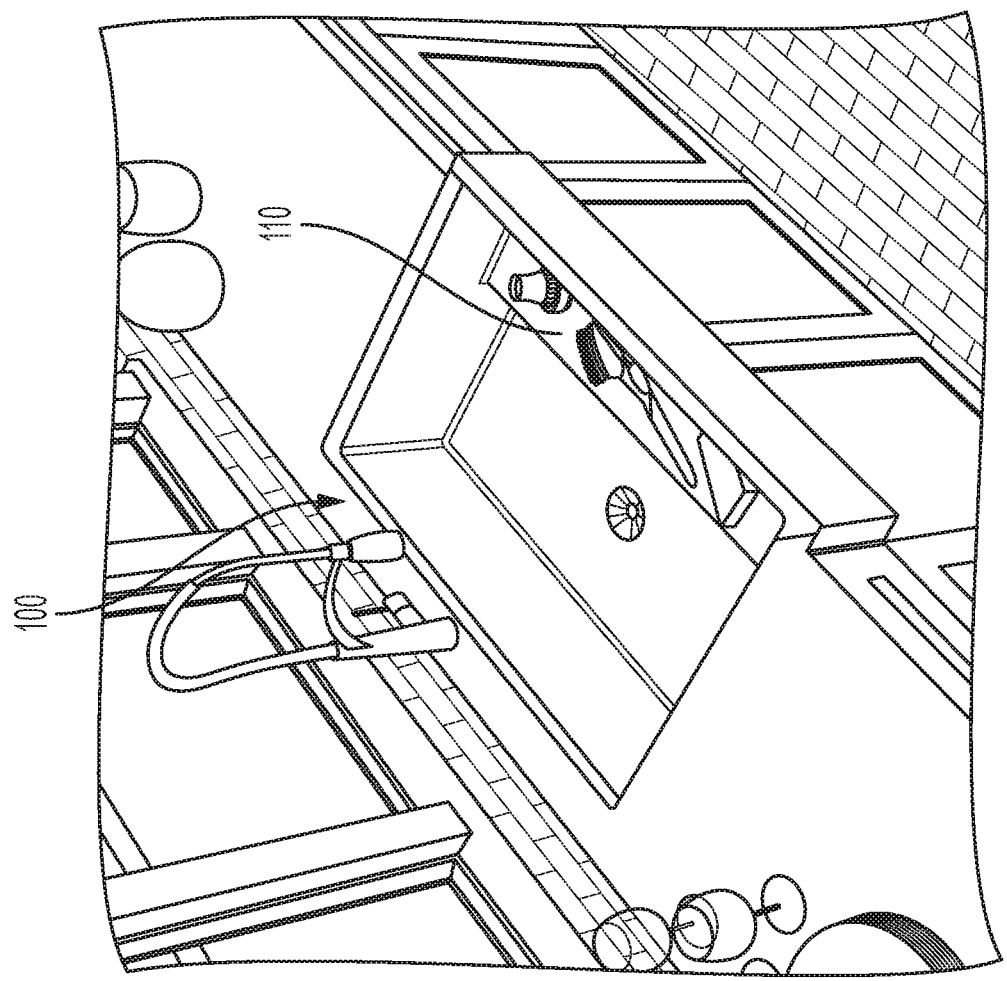
FIG. 1 illustrates a perspective view of an example sink basin installed in a counter according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Various embodiments of the present disclosure describe a sink having a stepped basin that includes a raised portion and a sunken portion. The raised portion of the sink basin provides a surface of the basin that is hidden from sight when viewed from vantage points away from the sink, which may be referred to herein as a "front ledge." In one embodiment, the raised portion of the sink is disposed along a front side of the sink and is offset from a top surface. In an alternative embodiment, the raised portion of the sink may be disposed along one end of the sink, which may be referred to as a "side ledge" or a "right" or "left" ledge.

FIG. 1 illustrates an example embodiment of the stepped sink basin of the present disclosure which includes a sink 100 having a raised portion 110 disposed along the front side of the sink and offset from the top surface of the sink. In one embodiment, the raised portion 110 may be utilized as a partially hidden storage ledge for items that may typically be left in the bottom of the sink adjacent a drain opening or on the countertop around the sink. For example, in FIG. 1, the raised portion 110 is illustrated as storing various items such that they are out of the way of the faucet, clear of the drain opening and out of sight while still enabling the unobstructed use of the sink. In another embodiment, the raised portion may include a particular surface configuration such that the raised edge may be utilized to facilitate draining water, washing clothing or other tasks typically undertaken at a sink.

The design for a sink 100 shown in FIG. 1, and more particularly the raised portion 110 of the sink basin, advantageously also creates an opening or space under the sink basin along the front portion of the sink. This opening or space makes the sink well suited to fit within a packaging envelope for a sink, such as those for compliance with ADA and industry standards, and for use by persons using wheelchairs. For example, as shown in FIGS. 2, 3 and 4, in certain embodiments where the raised portion of the stepped sink basin is at the front end of the sink, the sink design may be sized to be ADA compliant.

Figure 2:
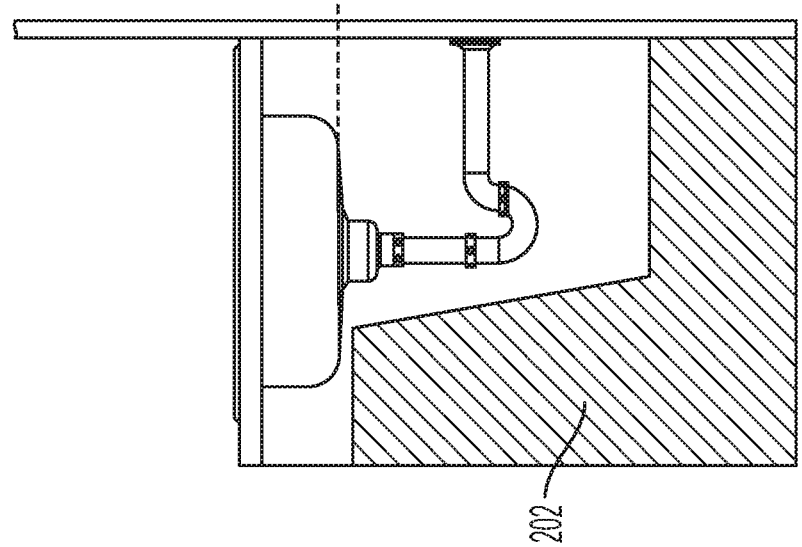
FIG. 2 illustrates a side view of a sink installed in a countertop, and illustrates an example ADA compliant envelope.

FIG. 2 shows a typical packaging envelope of an ADA compliant, accessible sink when installed. As can be seen in FIG. 2, proper installation of a sink in conformance with ADA standards includes (1) a maximum front height of 24 inches, (2) a maximum front sink depth of 7 inches, and (3) an opening or unobstructed area in front of the sink having (3A) a front height at a minimum of 27 inches, (3B) a depth of a minimum of 17 inches, and (3C) an angled opening spanning from a minimum of 8 inches of depth at the top to 11 inches of depth toward the bottom, at a height of a minimum of 9 inches from the ground. This creates the "L"-shaped envelope 202 which enables a person in a wheelchair to access the sink more easily by moving a portion of the wheelchair under the sink. Additionally, a sink installed in compliance with ADA standards is at least 30 inches wide when viewed from the front.

Figure 3:
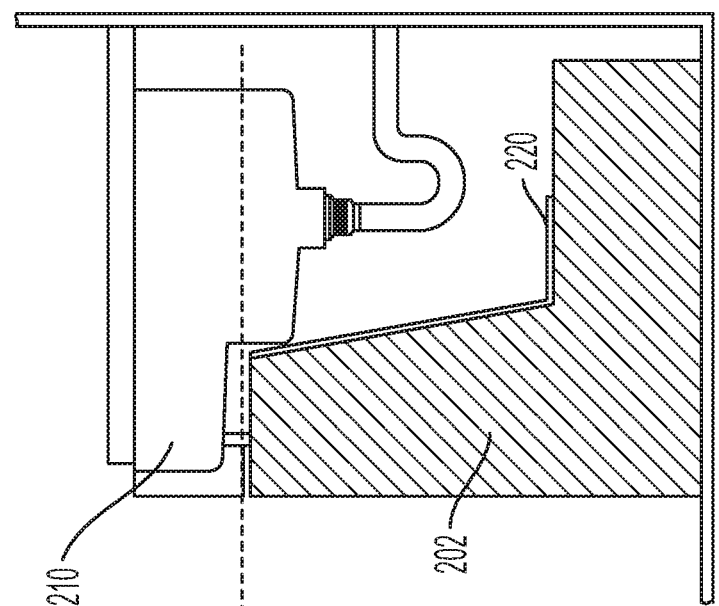
FIG. 3 illustrates a side view of a sink of the present disclosure installed in a countertop, and illustrates an example ADA compliant envelope.
Figure 4:
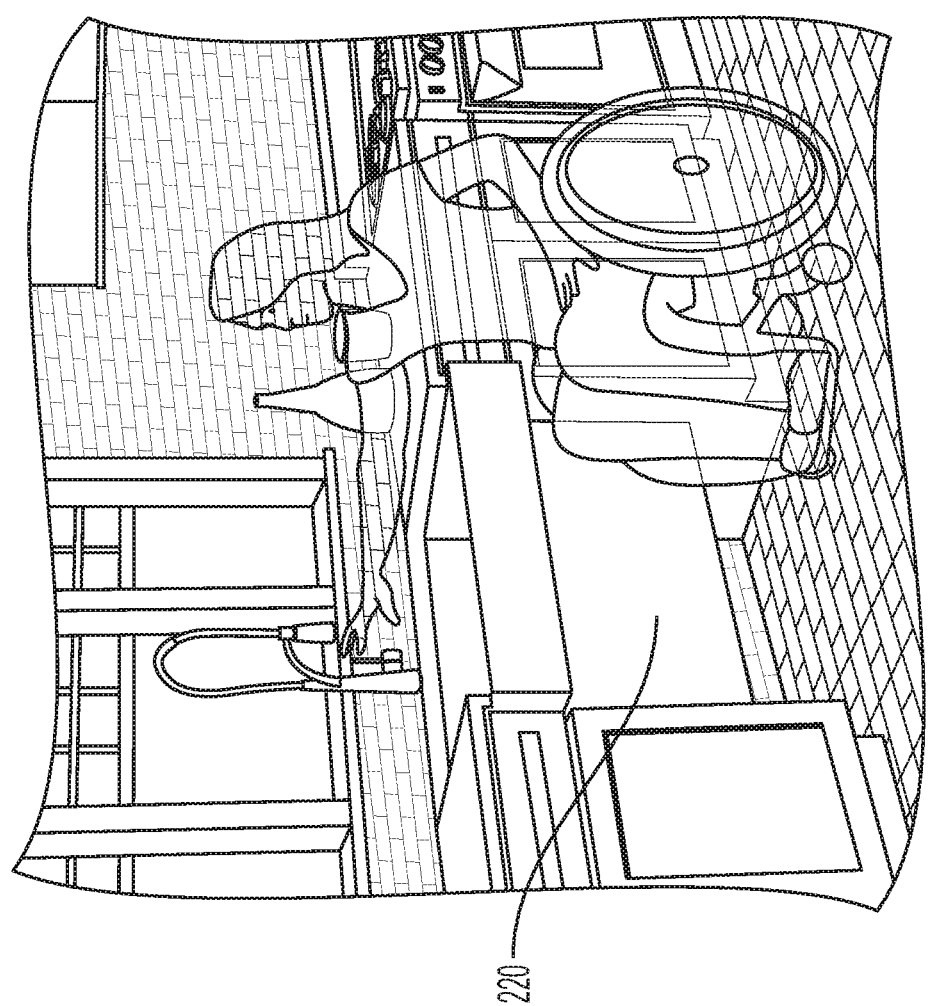
FIG. 4 illustrates a perspective view of a person accessing the sink of FIG. 3.

FIG. 3 shows a cross section of a sink 210 in accordance with the present disclosure. As illustrated by FIG. 3, in this embodiment, the sink 210 of the present disclosure is arranged such that it does not interfere with the envelope 202 which enables a person in a wheelchair to access the sink 210. It should be noted that a typical sink without a front ledge of the present disclosure has a maximum depth of 7 inches, when installed in compliance with ADA rules (e.g., as in FIG. 2). Embodiments of the present disclosure, however, enable the sink basin to have a much deeper portion (e.g., 9 inches or more) while still remaining within the ADA rules.

The dimensions shown in FIG. 3 are illustrative of an exemplary embodiment. In the illustrated embodiment, the sink 210 has a front-to-back depth of 21.75 inches, a front ledge front-to-back depth of 7.25 inches, a ledge or raised portion depth of 5.5 inches at a rear edge, and a lower basin depth of 9.75 inches.

It should be appreciated that the front-to-back depth of the sink 210, the raised portion, and the lower basin can be any suitable length that enables the sink 210 to be installed such that the envelope 202 is unobstructed. Furthermore, the raised portion depth and the lower basin depth can also be any suitable depth that enables the sink 210 to be installed such that the envelope 202 is unobstructed. For example, the lower basin depth may be 9 inches or more (e.g., such as a premium sink depth), or may be up to 12-14 inches (e.g., such as for a laundry application). In a laundry context, a user may wish to soak items in the sink, meaning that a deeper lower basin may be preferred. Alternatively, in a kitchen context, the user may wish to have a disposal installed underneath the drain, meaning that the lower basin depth may be limited to enable the disposal to fit.

FIG. 4 illustrates a rendering to highlight the suitability of the sink for use by persons in a seated position. As illustrated, the size and shape of the sink advantageously enables a seated user to reach to the bottom of the sunken sink basin while in the seated position. Additionally, the raised portion of the sink basin, which is also recessed or lowered relative to the top surface of the sink, provides organization and a storage ledge to place items such as brushes, soap, strainers, sponges, compost containers, utensil containers, etc. When used in a kitchen application, the sink can be manufactured at a premium depth of 9 inches or more while remaining compliant with ADA rules when installed properly. When used in a laundry or utility application, the sink can be manufactured at a full premium depth of 12 inches or more, while also remaining compliant with ADA rules, i.e., able to be installed without obstructing the accessibility envelope 202.

It should be appreciated that embodiments disclosed herein can be used in office spaces, commercial applications, residential applications, kitchens, laundry or utility rooms, and more.

As shown in FIGS. 3 and 4, a decorative shroud 220 can be installed to conceal the drain pipe. Both the decorative shroud 220 and the panel on the front face of the sink 222 may be customized for aesthetic purposes to best match with the surrounding structures.

It should be appreciated that various embodiments of the present disclosure may include a variety of sink configurations including, but not limited to a single bowl or double bowl sink basin and any variety of bowl depths. Various embodiments of the present disclosure may include any variety of mounting configurations including, but not limited to, an apron front design, an undermount design, and a top mount design. Additional, various embodiments of the present disclosure may be constructed of any of a variety of gage and material types including, but not limited to Quartz, fireclay, copper, etc., and with different surface finishes. Design width variances can include a minimum of 30" wide for ADA specs. Single or double bowl options can include 30" (e.g., single bowl versions) and 36" (e.g., single and possible double bowl versions). Various additional configurations are illustrated in U.S. Non-Provisional patent application Ser. No. 16/746,086.

Figure 5:
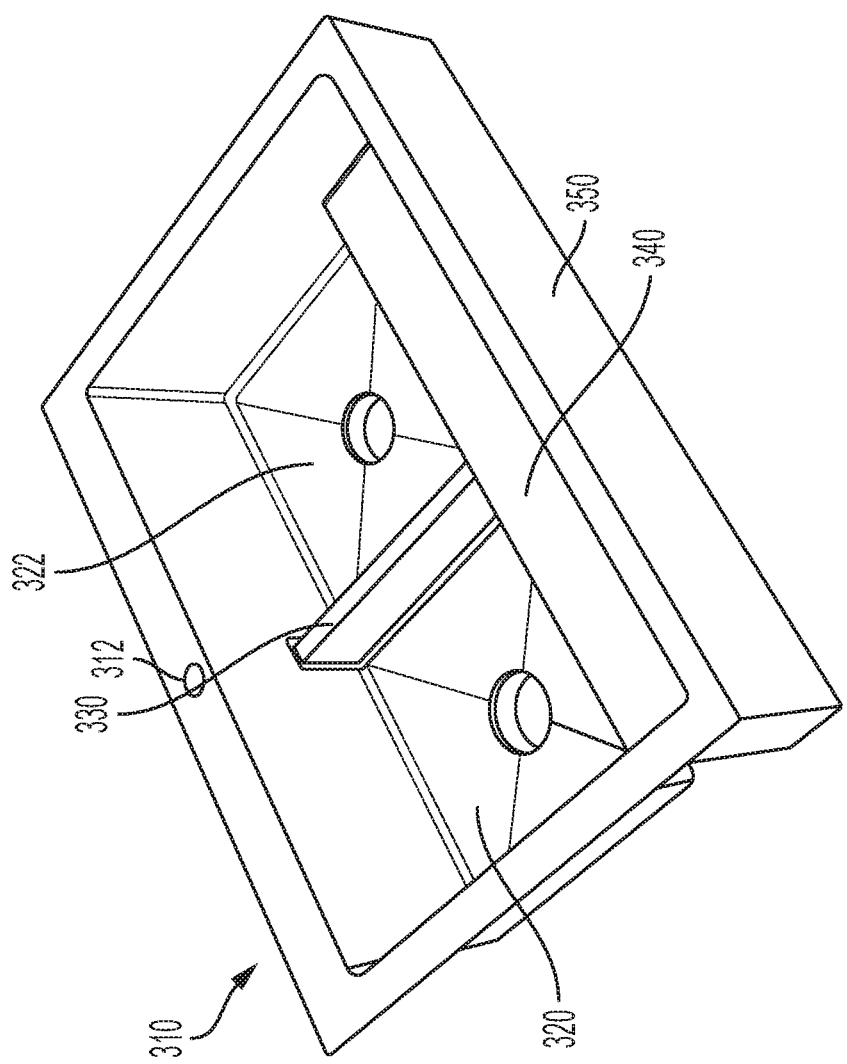
FIG. 5 illustrates a perspective view of a double basin sink according to embodiments of the present disclosure.

FIG. 5 illustrates an outline view of an example embodiment of the present disclosure having a dual basin, stepped basin sink 310 having an apron front. The sink 310 includes a first lower basin 320, and a second lower basin 322, separated by a low divider 330. The sink 310 also includes a raised portion 340, raised with respect to the first and second lower basins 320 and 322 The low divider 330 may be lower than the raised portion 340, as shown in the Figure. In an alternative embodiment, the low divider 330 may be even with or raised relative to the raised portion 340.

A hole 312 represents the opening through which the faucet may be connected to the stepped basin sink 310. Although the opening 312 in FIG. 5 is illustrated along the upper surface of the rear wall of the sink, in various alternative embodiments of the present disclosure may include the faucet opening along either of the side walls of the sink. Additionally, in certain embodiments of the present disclosure, the sink walls do not include an opening for the faucet, rather the faucet may be mounted in the counter along either side of the sink or along the rear end of the sink. It should be appreciated that including an opening for the faucet within the sink allows for simplified installation such that no additional mounting within the surrounding counter space is necessary.

The illustrated sink 310 includes an apron front 350. It should be appreciated that in certain embodiments, the maximum height of the top of the apron may not exceed 34 inches, which is the maximum ADA height. It should further be appreciated that where surrounding cabinet height is customized to be a maximum 34" countertop height, then the top front of the apron front would be lower than 34". In certain embodiments, the apron front design includes a front face 350 that may be constructed of a removable panel that may be available in a variety of materials and colors. Such an embodiment would provide for customization to any surrounding application.

As described above, in certain embodiments, the sink may be installed using an undermount (e.g., the sink flange sits under the countertop), a top mount arrangement (e.g., the sink is mounted on top of the counter top, wherein the rim of the sink extends above the countertop), or a flush mount (e.g., the sink flange is flush with the top of the countertop). In embodiments where the is in a top mount arrangement, the rim that extends above the countertop includes corresponding openings for the faucet along the upper rim. In certain embodiments, the sink may also be dimensioned to fit within standard cabinets. One such example is shown and described in U.S. Non-Provisional patent application Ser. No. 16/746,086.

Figure 6:
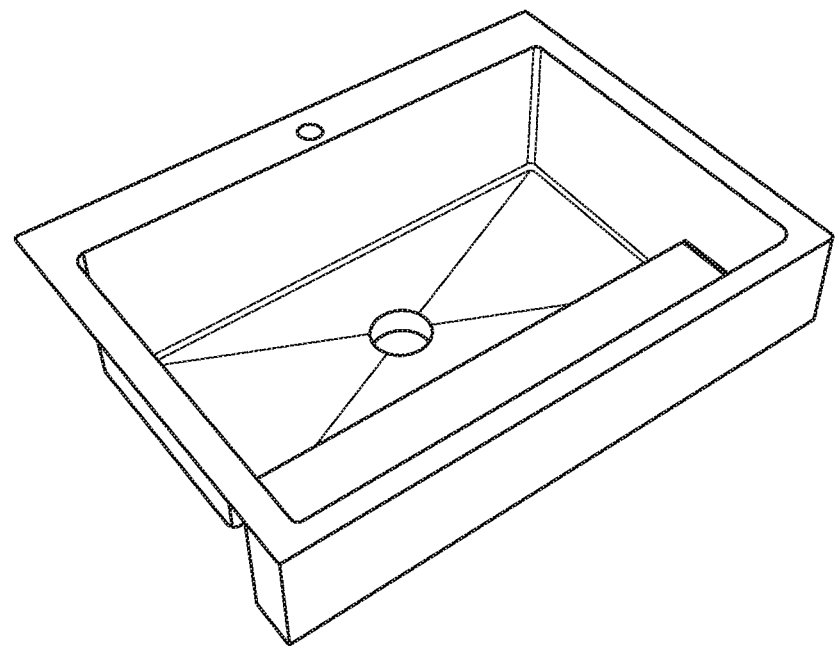
FIGS. 6, 7, 8, 9, 10, and 11 illustrate example sinks, according to embodiments of the present disclosure.
Figure 7:
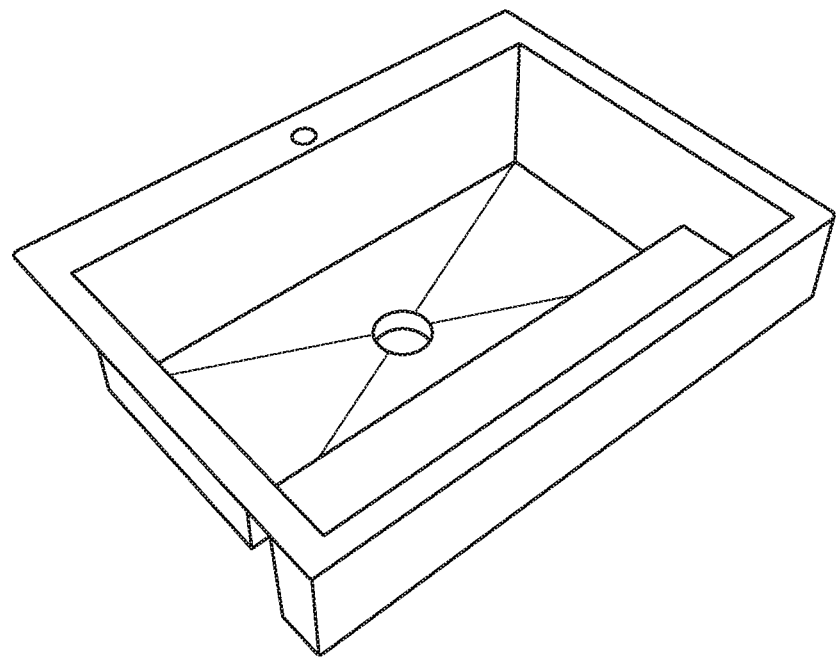

FIGS. 6 and 7 Illustrated further variations of the present disclosure. FIG. 6 illustrates an embodiment of a sink including a single lower basin. FIG. 7 illustrates an embodiment in which the sink includes tight radiused corners. It should be appreciated that various embodiments may include a single bowl or lower basin, a double bowl or lower basin, or more. In some examples, a first lower basin may have a different depth than a second lower basin in the same sink. In some examples, the lower basins may be offset such that one lower basin is larger than another. In some examples, the sink may include a low divider that is half the height of a standard double bowl sink divider.

Figure 8:
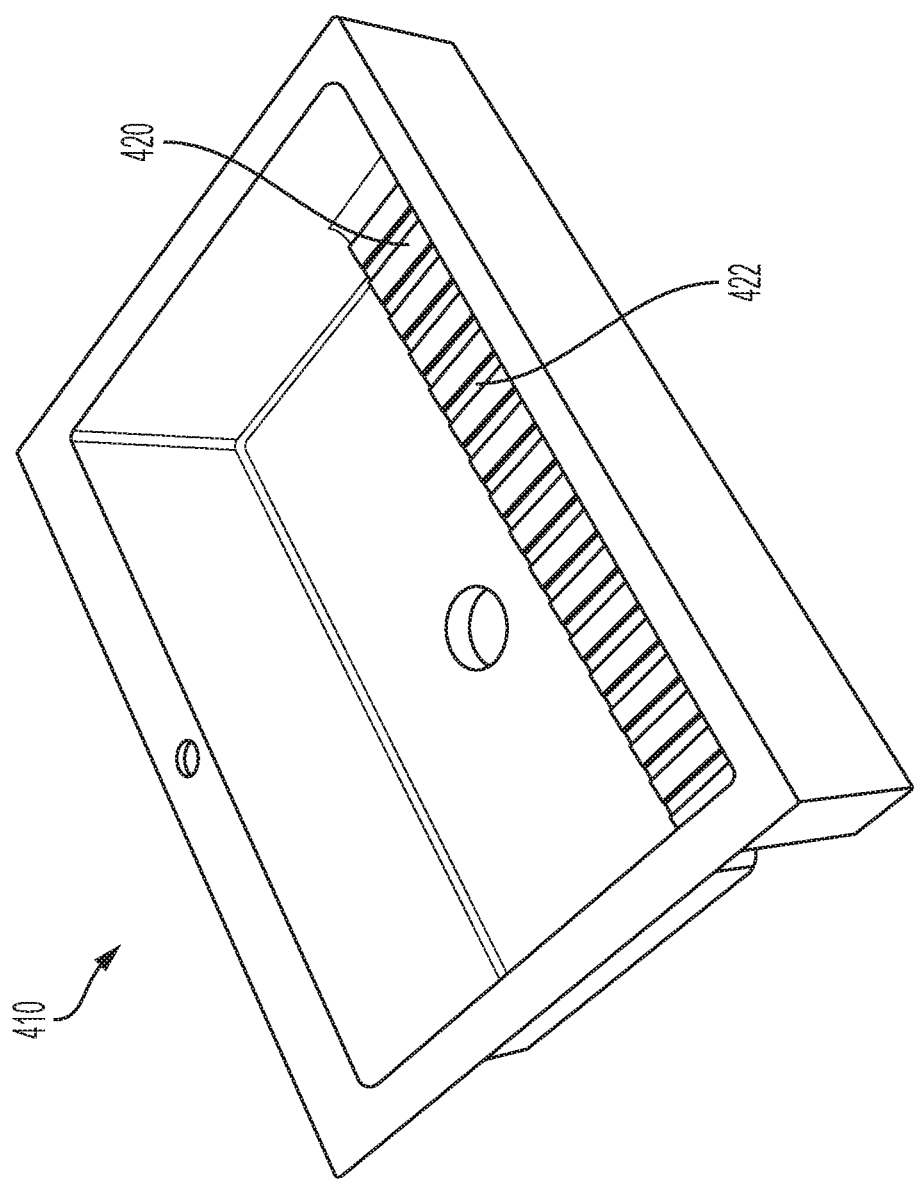

In some examples, the sink may also be made from different materials such as different metals (stainless steel, copper, and the like) or other materials such as fireclay, quartz, or other composite materials. An embodiment showing a sink made from quartz is shown in FIG. 8. It is noted that the molding operation used to form the sink can also be used to introduce other features such as draining channels, ridges, or other features in the ledge of the sink.

Additional embodiments are also contemplated. For example, in one embodiment, the raised portion of the stepped sink basin may include various raised portion surface features, or surface configurations, such as ridges or draining channels. As shown in FIG. 8, the sink 410 includes a raised portion 420 that has draining channels 422 oriented front to back along the length of the raised portion 420. Alternatively, the draining channels or ridges may be oriented parallel to the front of the sink 410, or at an angle. Alternatively, various other patterns or orientations of ridges, grooves, draining channels, or other features can be used.

Additionally, the connecting surface 640 (shown in FIG. 10) of the stepped sink basin may be angled to drain off water. Additionally, in one embodiment, the connecting surface 640 may include connecting surface features, patterns or embossed components to hold and elevate things positioned on the connecting surface 640. In one embodiment, (e.g., particularly for a laundry and/or utility application) the connecting surface 640 may include an inclined washboard (with or without pattern/ribs). The incline may be angled toward the middle of the sink (e.g., away from the edge) such that any water is directed toward the lower basin and drain. In an alternative embodiment, the upper surface of the raised portion may be a smooth surface, and the angled connecting surface between the raised portion and the lower basin may include ridges, as further illustrated and described in FIGS. 10 and 11.

In some examples, the sinks of the present disclosure may be paired with a standard drain. In other examples, a specialized strainer may be used, such as a deeper strainer, or a perfect drain.

Figure 9:
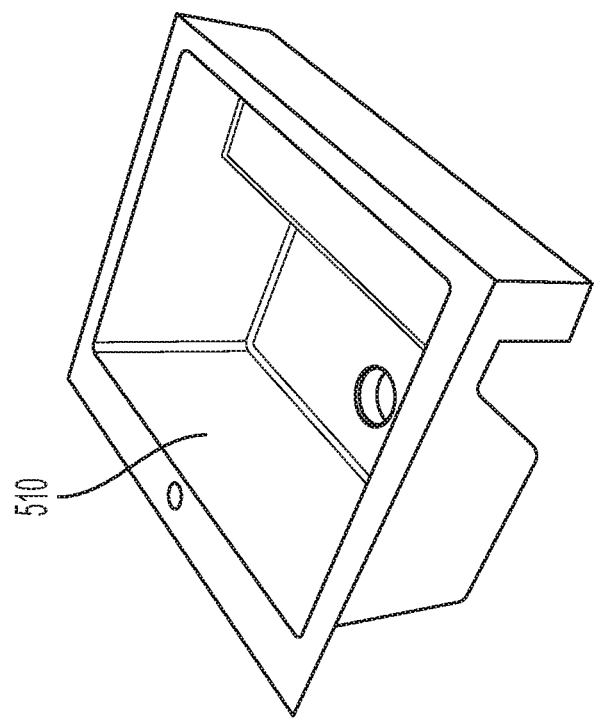

It should be appreciated that the stepped sink basin of the present disclosure may be made of a variety of materials. For example, the embodiment illustrated in FIG. 9 includes a sink 510 made from stainless steel, and the embodiment illustrated in FIG. 10 includes a sink 610 made from fireclay or quartz. It should be noted that these materials are for example only, and that any of the features disclosed herein may be used in any suitable sink and made using any suitable material. The sink 610 of FIG. 10 further includes a raised portion 620, connected to the lower basin 630 via the connecting surface 640. As noted above, the connecting surface 640 includes elevated ridges 642 extending across the surface 640, which may act as a washboard. The elevated ridges 642 may extend only partially across the surface 640, or may extend fully across the connecting surface 640. In some examples, the elevated ridges 642 may be split into two or more sections such that one or more non-elevated channels extends from the raised portion 620 to the lower basin 630. The connecting surface 640 can alternatively be flat, or include a different design feature. It should be appreciated that the embodiments illustrated in FIGS. 9 and 10 may be well suited for laundry or utility use.

Figure 10:
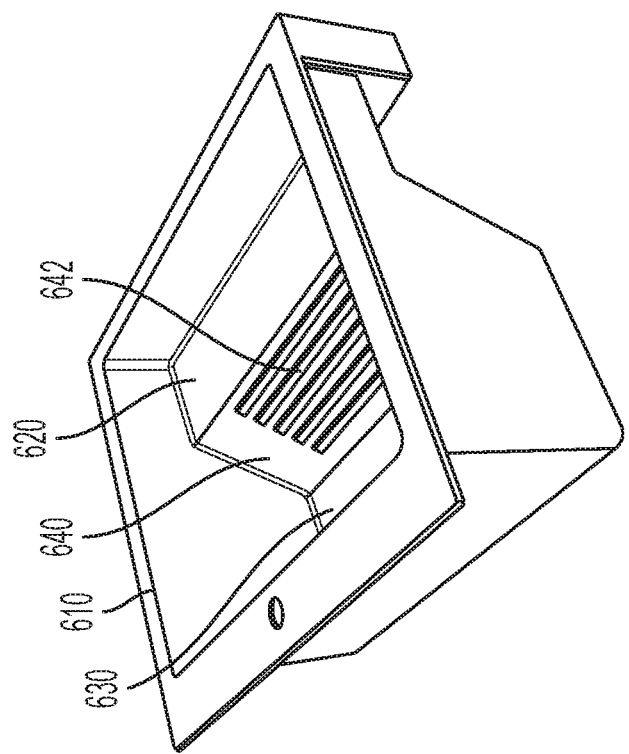
Figure 11:
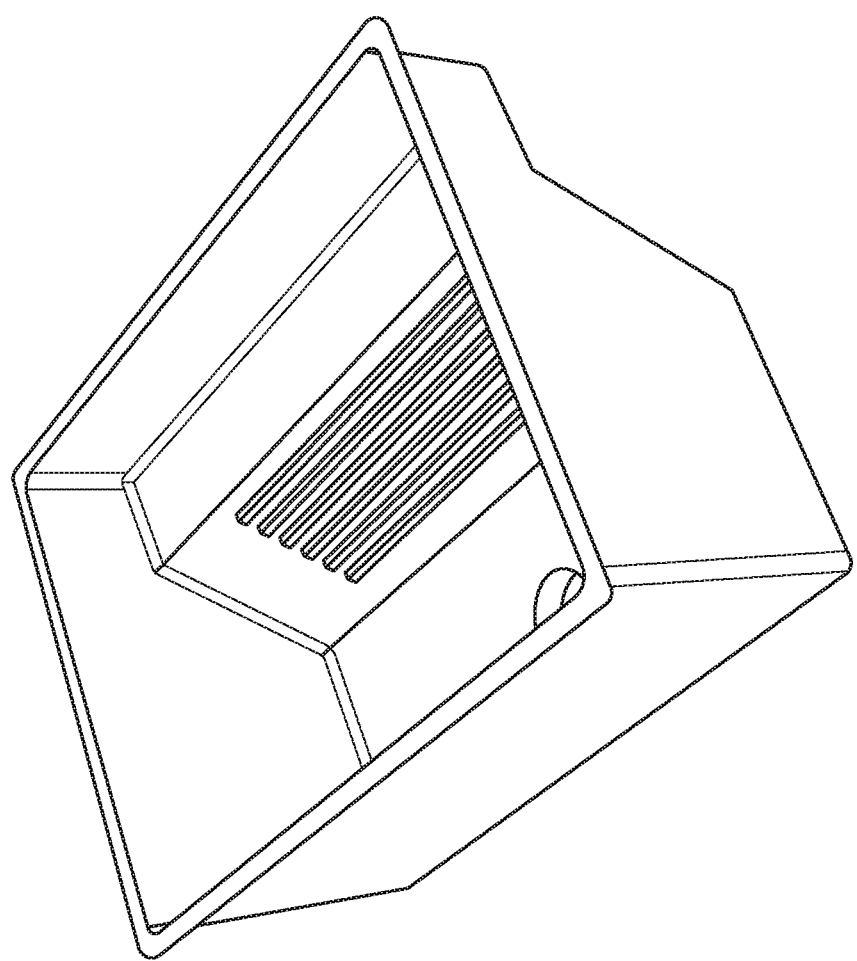

It should also be appreciated that the inclined washboard connecting surface 640 shown in FIG. 10 can be added to a sink of stainless steel fabricated construction, as shown in FIG. 11. The inclined connecting surface 640 can alternatively be flat, or include a different raised feature configuration.

Various embodiments of the present disclosure may also include accessories, such as but not limited to: a cutting board, a reversible bottom grid, utensil containers, and other accessories can also be used. The sink can also accommodate various accessories, which are arranged to provide convenience to the user. For example, FIGS. 12 and 13 illustrate an example sink 710 including a wire grid 720. The wire grid 720 includes a platform surrounded by vertically extending members or walls such that depending on the orientation of the grid 720, the platform of the grid 720 may be used as a standard bottom grid (as illustrated by FIG. 12) or may be flipped to be used as an elevated work shelf (as illustrated by FIG. 13). For example, in the configuration of FIG. 12, the wire grid 720 is used as a standard bottom grid to protect the sink bottom from excessive scratches or wear and tear, as a soaking colander where utensils are placed over it for soaking, and where the upper handles can be used as rails for additional accessories or as handles. In the configuration of FIG. 13, the wire grid 720 is flipped to extend the ledge surface to create a uniform flat front to back working surface and can also be used when soaking or separation is needed for items under the sink and the top surface of the ledge. In certain embodiments, the grid 720 includes an optional opening 722 that is positioned over the drain opening. It should be appreciated that in various embodiments the drain of the sink, and thus the corresponding drain opening 722 of the grid may be positioned in a different location. The opening 722 of the grid 720 may be sized to accommodate a removable drain cover, such as the exemplary drain cover 730. The drain cover may be added into the opening 722 of the grid 720 to increase versatility of the grid 720 in the elevated position. For example, the drain cover 730 may be useful to prevent objects from falling into the grid opening and into the drain.

It should be appreciated that the height of the wire grid 720 may be the same as the height of the front ledge. Alternatively, the wire grid 720 may be lower or higher than the front ledge.

Figure 14:
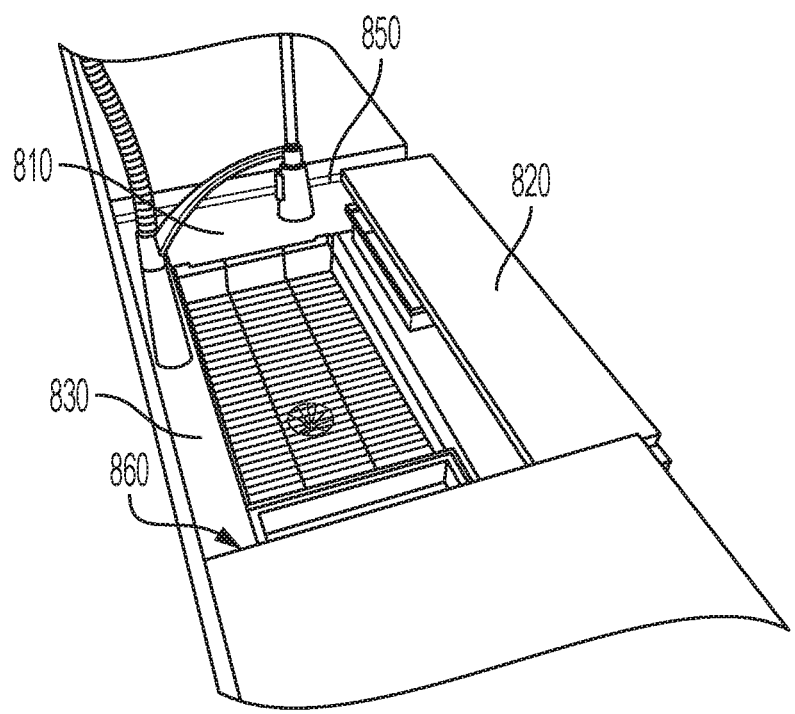
FIGS. 14 and 15 illustrate perspective views of an example sink including a cutting board in two positions, according to embodiments of the present disclosure.
Figure 15:
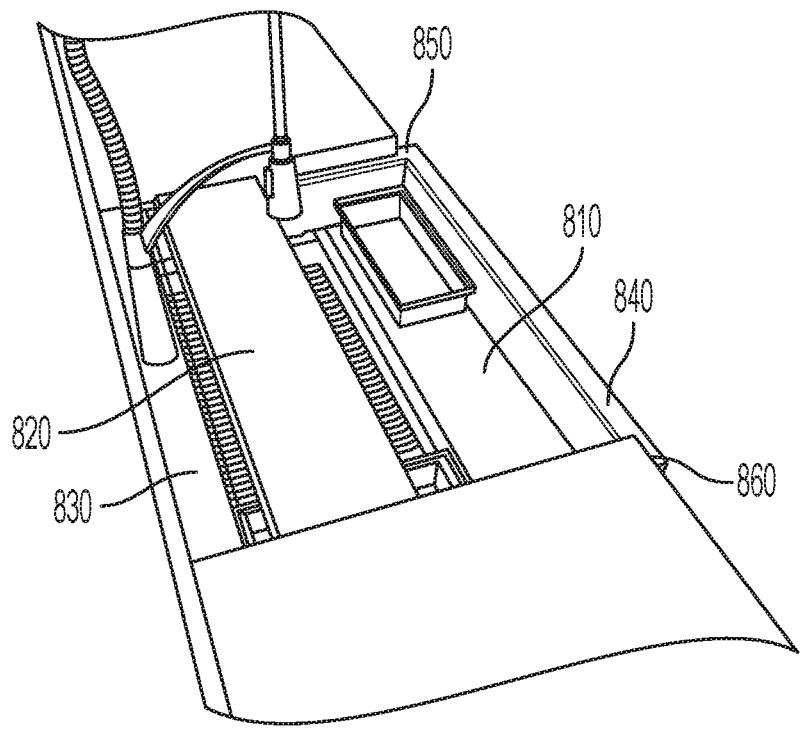

Various embodiments of the present disclosure further include accessories that are designed to specifically fit into the stepped basin sink of the present disclosure. For example, other accessories that can be associated with example sinks of this disclosure include a cutting board 820, which, in a first position as shown in FIG. 14, can act both as a work surface at the front of the sink, and a cover to hide items stored on the ledge surface beneath it. It is contemplated that the cutting board 820 can extend across the entire width of the sink, so that it is supported by the exposed edges 850, 860 of the sink 810, as shown in FIGS. 14 and 15. In one embodiment, the side edges of the cutting board 820 may be shaped to slide along the exposed edges 850, 860 of the sink 810. In certain embodiments, the cutting board 820 may include a stop on its underside to prevent the board from sliding off the sink, for example onto the floor. In addition, various contact surfaces can be applied to the underside of the cutting board 820 to interact with the edges of the sink 810 so that there is frictional resistance when the cutting board is pushed along the edges of the sink. It should further be appreciated that while the cutting board 820 shown in FIGS. 14-15 is a horizontal board sized to fit along the side edges of the sink 810, in certain alternative embodiments, the cutting board 820 is vertical such that it fits the sink from the rear 830 to the front 840 walls of the sink 810.

Figure 16:
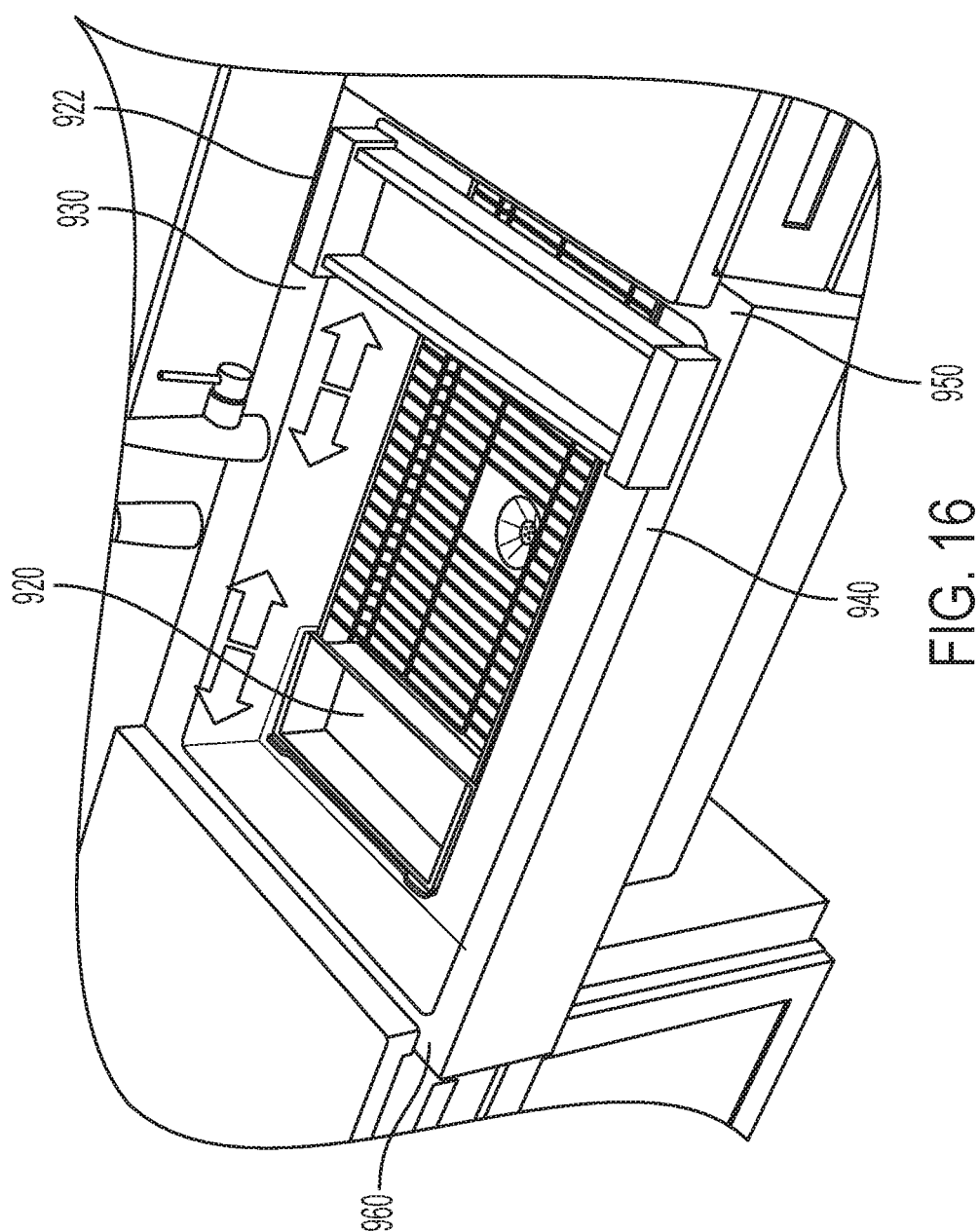
FIG. 16 illustrates a sink including an example storage container, according to embodiments of the present disclosure.

Another accessory that can be associated with example sinks of this disclosure is a storage containers 920 and 922 as shown in FIG. 16. As shown in FIG. 16, the storage containers 920 and 922 are rectangular with two short side walls and two long side walls rising from a flat bottom portion.

In this embodiment, the short side walls of container 920 are sized to fit within the vertically extending members or walls of the reversible wire grid described with respect to FIG. 12. The storage container 920 has a circumferential lip at the top edge of each of the four side walls, with the lips at the short walls of the storage container 920 extending over the top of the adjacent vertically extending members of the wire grid so that the storage container 920 can slide along the wire grid supported by the lips at the tops of the short walls of the container. In one embodiment, storage container 922 includes a handle or ledge along both side walls. The handle is shaped to sit along the rear 930 and front 940 walls of the sink. In certain embodiments, the storage container 920 can slide along the rear 930 and front 940 walls of the sink. In an alternative embodiment (not shown), the storage containers 920, 922 can have slots or other perforations cut through the bottom portion thereof so that the storage container can also act as a colander, with the slots permitting water to flow out of the storage container and into the sink basin. The storage container 922 can also be sized to sit on the side ledges of the sink 950, 960, as shown in FIGS. 14 and 15.

Figure 17:
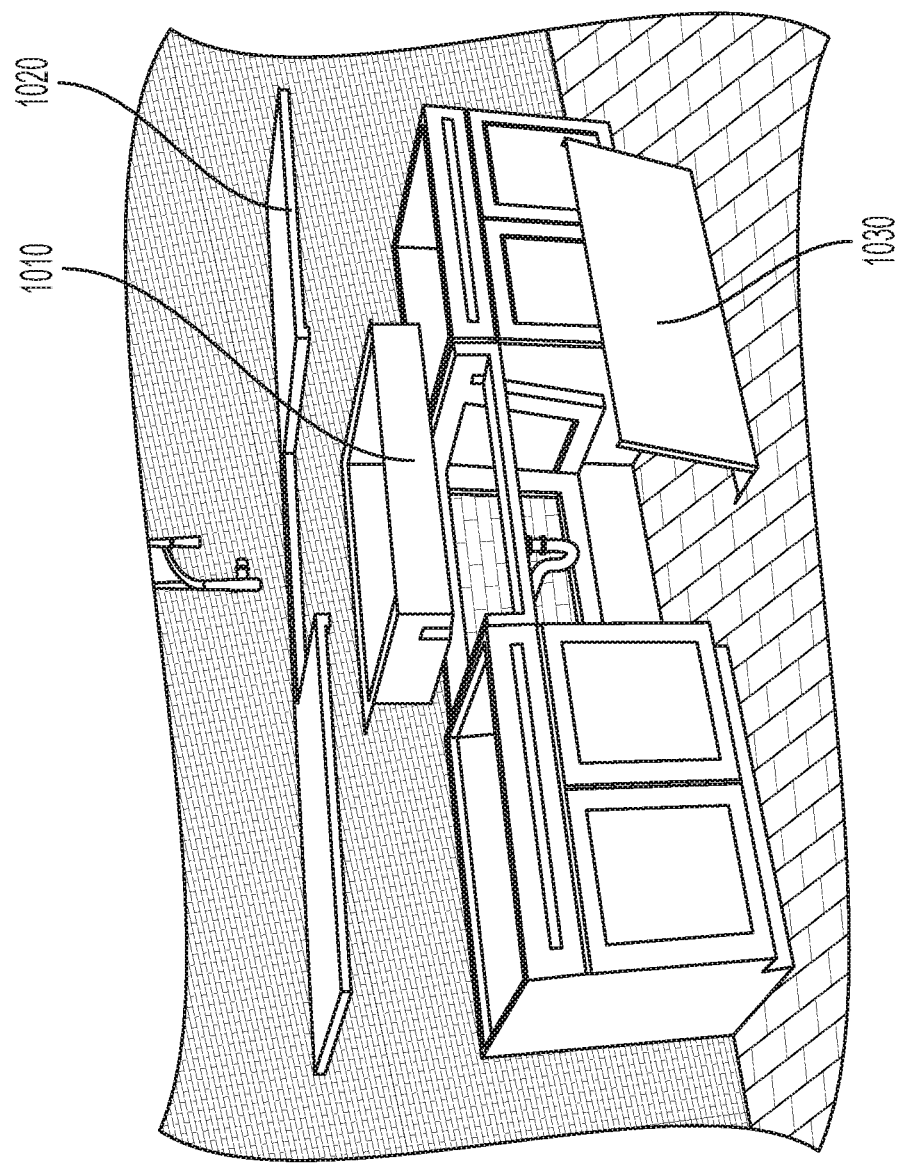
FIG. 17 illustrates an example sink installation, according to embodiments of the present disclosure.
Figure 18:
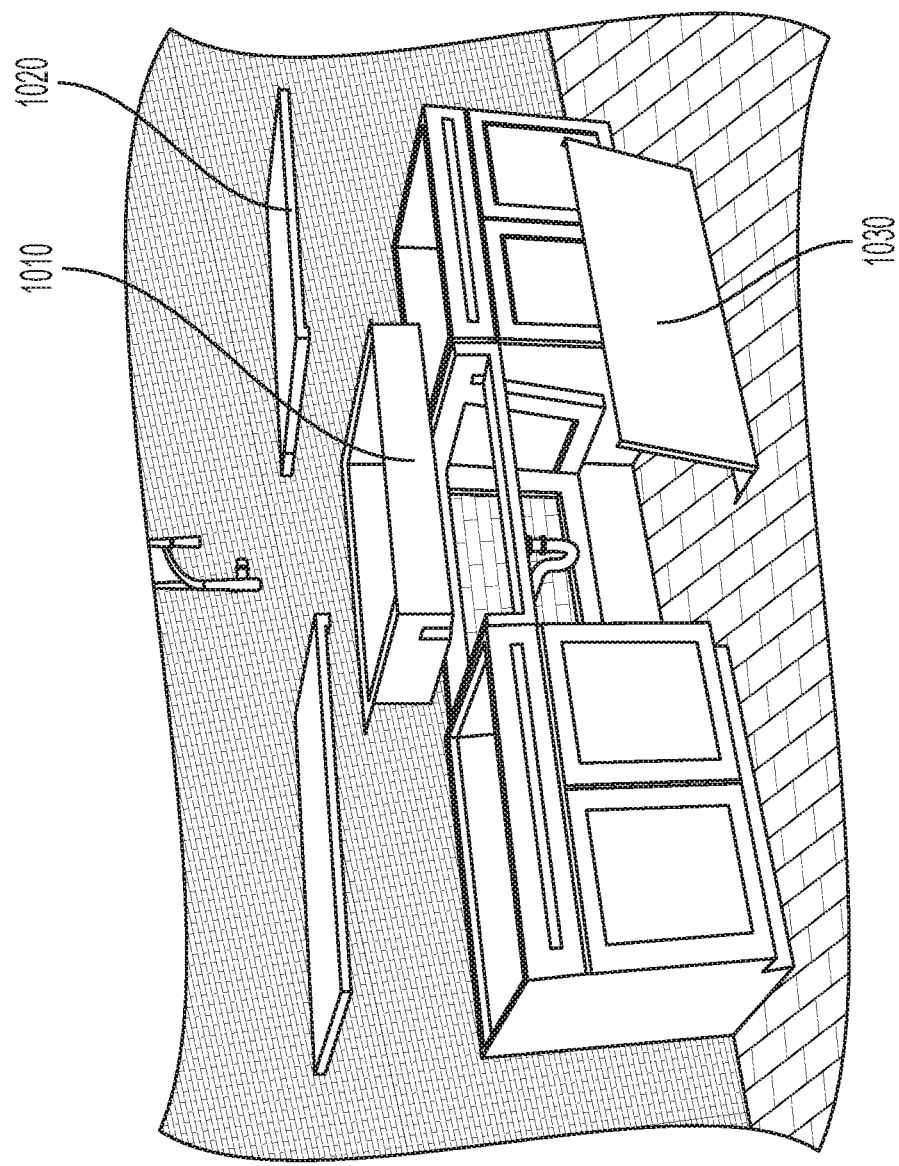
FIG. 18 illustrates an example sink installation, according to embodiments of the present disclosure.

As described above, with respect to installation, the sink can be installed in an undermount configuration, top mount configuration, or flush mount configuration. FIG. 17 illustrates an example installation, using an undermount configuration, in which the sink 1010 is installed under the counter top 1020. As illustrated, in this embodiment, the faucet mounts to the counter top along the rear side of the sink. The sink 1010 is also installed with a front panel 1030 that hides the drain and plumbing. FIG. 18 illustrates an example embodiment that does not include any rear countertop. In this example embodiment, the faucet mounts directly to the sink. Such an embodiment allow for the front edge of the sink to be parallel to the rear edge of the sink and thus permit use of the various accessories described herein. It should be appreciated that other installations such as ones without backsplash, without a front panel, or using a different mounting arrangement can also be used.

It should be appreciated that the embodiments illustrated in the Figures include a raised portion that is positioned on a front edge of the sink. It should also be appreciated that the use of the term "front" may be relative to a position of the sink when installed. For example, the same features and functions as described in this document may also apply to sinks in which the raised portion is positioned on the left or right side (as viewed from the long end of the sink). For example, a sink having a raised portion may be installed on an end of a counter, such that the user accesses the sink from the side, and the faucet is at the rear of the sink (i.e., to the user's right). The reverse may also be possible, wherein the raised portion is on the left side of the sink.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sink comprising:
   a front wall, a rear wall, a first side wall and a second side wall;
   a raised portion extending from the front wall toward the rear wall, and extending between the first and second side walls below a top plane of the sink;
   a lower basin extending from a bottom of the rear wall toward the front wall, the lower basin defining a drain;
   a connecting surface connecting the raised portion to the lower basin; and
   a wire grid positionable within the lower basin, wherein the wire grid is positionable in a first position to create a top surface even with a rear edge of the raised portion.

2. The sink of claim 1, wherein the raised portion is oriented at an angle with respect to the top plane of the sink.

3. The sink of claim 2, wherein a front edge of the raised portion is higher than a rear edge of the raised portion.

4. The sink of claim 1, wherein the raised portion includes a plurality of raised portion surface features.

5. The sink of claim 4, wherein the plurality of raised portion surface features are oriented parallel to the front wall.

6. The sink of claim 4, wherein the plurality of raised portion surface features are oriented transverse to the front wall.

7. The sink of claim 1, wherein the connecting surface is oriented parallel to the front wall.

8. The sink of claim 1, wherein the connecting surface is oriented at an angle with respect to the front wall.

9. The sink of claim 1, wherein the connecting surface includes a plurality of connecting surface features.

10. The sink of claim 9, wherein the plurality of connecting surface features are oriented parallel to the front wall.

11. The sink of claim 9, wherein the plurality of connecting surface features are oriented transverse to the front wall.

12. The sink of claim 1, wherein the lower basin comprises a first bowl and a second bowl separated from the first bowl.

13. The sink of claim 12, further comprising a divider extending from the rear wall to the connecting surface, separating the first bowl and the second bowl.

14. The sink of claim 12, wherein the first bowl is a different shape than the second bowl.

15. The sink of claim 12, wherein the first bowl has a different depth than the second bowl.

16. The sink of claim 1, wherein connections between the front wall and the first and second side walls, and between the rear wall and the first and second side each have a radius.

* * * * *